United States Patent
Fukuchi et al.

[11] Patent Number: 5,991,685
[45] Date of Patent: Nov. 23, 1999

[54] COMBUSTION STATE DETECTION SYSTEM FOR INTERNAL COMBUSTION ENGINE

[75] Inventors: Eisaku Fukuchi, Hitachi; Akihito Numata, Ibaraki-ken; Takanobu Ichihara, Hitachinaka, all of Japan

[73] Assignees: Hitachi, Ltd.; Hitachi Car Engineering Co., Ltd., both of Japan

[21] Appl. No.: 09/025,704

[22] Filed: Feb. 18, 1998

[30] Foreign Application Priority Data

Feb. 19, 1997 [JP] Japan .................................. 9-034976

[51] Int. Cl.⁶ ................................................ G01M 15/00
[52] U.S. Cl. ......................... 701/110; 73/116; 73/117.3; 123/419; 123/436
[58] Field of Search .................................. 73/116, 117.2, 73/117.3; 123/419, 436; 701/110, 111

[56] References Cited

U.S. PATENT DOCUMENTS

| | | | |
|---|---|---|---|
| 5,044,194 | 9/1991 | James et al. | 73/117.3 |
| 5,245,866 | 9/1993 | Hashiguchi et al. | 73/117.3 |
| 5,263,453 | 11/1993 | Wakahara et al. | 123/436 |
| 5,452,604 | 9/1995 | Namiki et al. | 73/116 |
| 5,531,108 | 7/1996 | Feldkamp et al. | 73/117.3 |
| 5,574,217 | 11/1996 | McCombie | 73/116 |
| 5,732,382 | 3/1998 | Puskorius et al. | 701/110 |
| 5,808,186 | 9/1998 | Matsumoto et al. | 73/117.3 |
| 5,832,404 | 11/1998 | Amano | 701/110 |

FOREIGN PATENT DOCUMENTS 58-51243  3/1983  Japan .
9-72241   3/1997  Japan .

*Primary Examiner*—George Dombroske
*Attorney, Agent, or Firm*—Evenson, McKeown, Edwards & Lenahan, P.L.L.C.

[57] ABSTRACT

A combustion state detection system for an internal combustion engine in which a timing signal associated with the rotation of the crankshaft by a predetermined angle is detected and corrected, and a combustion state parameter is calculated from the timing signal. Further, the deviation of the calculated combustion state parameters for normal combustion is detected between the cylinders, and the correction amount of the timing signal is calculated. A reference cylinder is determined by the means for detecting the deviation. The deviation is detected between the combustion state parameter for normal combustion of the reference cylinder and the cylinder opposed thereto and the combustion state parameter for normal combustion of the remaining cylinders. The correction amount is calculated in such a manner as to control the correction amount to not more than a predetermined value or to zero from the detected deviation.

8 Claims, 10 Drawing Sheets

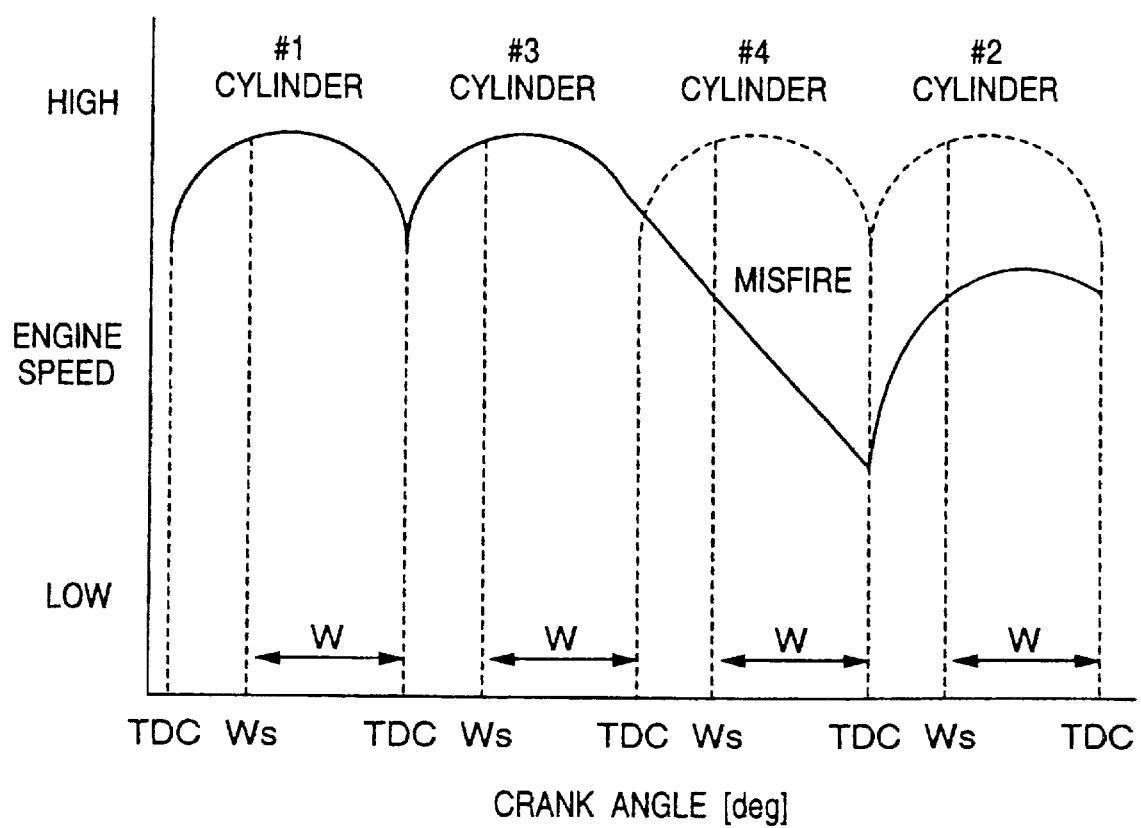

COMBUSTION STATE DETECTION SYSTEM FOR INTERNAL COMBUSTION ENGINE

CROSS-REFERENCE TO RELATED APPLICATION

The present application relates to subject matter described in co-pending application Ser. No. filed on Nov. 7, 1997 entitled "Apparatus and Method of Detecting Combustion State of Internal Combustion Engine and Recording Medium Storing Program for Execution of the Detecting Method" by Eisaku Fukuchi and Akihito Numata, and assigned to the assignees of the present application, and to subject matter disclosed in co-pending application Ser. No. 08/704,368 filed on Aug. 28, 1996 entitled "Detector Device For Combustion State in Internal Combustion Engine" by Eisaku Fukuchi et al, now U.S. Pat. No. 5,828,976 and assigned to the assignees of the present application. The disclosures of those co-pending applications are incorporated therein by reference.

BACKGROUND OF THE INVENTION

The present invention relates to a combustion state detection system for an internal combustion engine (hereinafter sometimes called the engine), or more in particular to a combustion state detection system for the engine in which a misfire can be detected in all operating areas of the engine where a positive torque is generated.

In the well-known technique disclosed in Japanese Patent Application Publication No. JP-A-58-51243, the engine operating conditions are detected by measuring the engine speed taking advantage of the relation between the engine speed and the torque generated by the engine thereby to detect a misfire indirectly. According to this technique, the engine speed is detected at two or more ignition points within a single ignition cycle from the previous ignition point to the current ignition point, and the change in engine speed is determined from the difference in engine speed at different ignition points within the single ignition cycle. The engine speed changes thus sequentially determined are processed statistically, and the combustion state of the engine is judged using the result of the processing.

In judging the engine state by detecting the engine speed as mentioned above, the rotational angular speed of a ring gear or a plate mounted on the crankshaft is detected. Such a method is effective in a comparatively low engine speed area. In a high engine speed area, however, variations due to the pitch fabrication error of the ring gear or the plate are significantly presented between the cylinders. The effect of the pitch error thus makes it inconveniently impossible to judge the combustion state of the internal combustion engine accurately.

For overcoming the above-mentioned inconvenience, the present applicant has proposed in Japanese Patent Application Publication No. JP-A-9-72241 a means for detecting a value corresponding to the pitch error during normal combustion to correct the engine speed signal. Specifically, the proposed means calculates a combustion state parameter from a timing signal associated with the crankshaft rotation by a predetermined angle, and the timing signal is corrected from the variations of the combustion state parameter for normal combustion. In this method, a reference cylinder is determined, the amount of correction of the timing signal for a cylinder group including the reference cylinder and a cylinder opposed thereto is reduced in the case where the combustion state parameter for normal combustion of the particular cylinder group is not less than a predetermined value, and the amount of timing signal correction is increased otherwise. The timing signal thus is corrected according to the correction amount thus determined, and the combustion state parameter is calculated using the corrected timing signal.

The conventional technique proposed as above, in which the timing signal is corrected according to the variations of the combustion state parameter for normal combustion, can detect the combustion state of the internal combustion engine without being affected by the pitch fabrication error of the ring gear or the plate even in high engine speed area. Nevertheless, the response for calculation of the correction amount and and the stability of the correction amount calculated have yet to be improved.

The prevent invention has been developed for obviating the above-mentioned problem, and the object thereof is to provide a combustion state detection system for an internal combustion engine, in which the combustion state can be accurately detected in all engine operating areas (especially, in high engine speed area) where a positive torque is generated, and especially in which the response and stability are secured in the calculation of the correction amount used for correcting the timing signal detected, while at the same time detecting a misfire positively.

SUMMARY OF THE INVENTION

According to one aspect of the invention, there is provided a combustion state detection system for an internal combustion engine, comprising means for detecting a timing signal associated with the rotation of the crankshaft by a predetermined angle, means for correcting the timing signal, means for calculating a combustion state parameter from the timing signal, means for detecting a deviation of the calculated values of the combustion state parameter between the cylinders, and means for calculating a correction amount for the timing signal, wherein the deviation detection means determines a reference cylinder and detects a deviation between the combustion state parameter for normal combustion of a cylinder group including the reference cylinder and an opposed cylinder (which has the same crank phase as the reference cylinder) and the combustion state parameter for normal combustion of the remaining cylinders, wherein the correction amount calculation means calculates the correction amount by PID action in such a manner as to control the detected deviation to not more than a predetermined value or to zero, and wherein the timing signal correction means corrects the timing signal based on the correction amount.

In a preferred specific example of the invention, there is provided a combustion state detection system for an internal combustion engine, in which the timing signal correction means multiplies the correction amount by the timing signal for the cylinders not opposed to the reference cylinder, and in which the deviation detection means detects a deviation between an average value of the combustion state parameters for normal combustion of the cylinder group including the reference cylinder and the cylinder opposed thereto and an average value of the combustion state parameters for normal combustion of the remaining cylinders.

According to still another aspect of the invention, there is provided a combustion state detection system for an internal combustion engine, further comprising a combustion state judging means for comparing the calculated combustion state parameter with a specific decision level thereby to judge a misfire of the engine.

The combustion state detection system for an internal combustion engine having a configuration described above utilizes the fact that the deviation between the value of the combustion state parameter for normal combustion of the cylinder group including the reference cylinder and the cylinder opposed thereto and the value of the combustion state parameter for normal combustion of the remaining cylinders is inversely proportional to a misfire SIN ratio (the ratio between a misfire signal and a non-misfire signal) and the fact that the S/N ratio can be maximized by reducing the deviation to a predetermined value (zero). For reducing the deviation to not more than the predetermined value or to zero, a correction amount (a pitch error correction coefficient) is multiplied by the timing signal for a group of cylinders not opposed to the reference cylinder, and the timing signal for the cylinders not opposed to the reference cylinder is set to conform with the timing signal for the reference cylinder. In this way, the combustion state is accurately detected in all the engine operating areas (especially in high engine speed area) where a positive torque is generated.

According to a further aspect of the invention, there is provided a combustion state detection system for an internal combustion engine, in which the PID action is used as a means of calculating a correction amount (pitch error correction coefficient) of the timing signal from the deviation between the value of the combustion state parameter for normal combustion of a cylinder group including the reference cylinder and the cylinder opposed thereto and the value of the combustion state parameter for normal combustion of the remaining cylinders. In this way, the deviation can be constantly controlled to not more than a predetermined value or to zero, and therefore a maximum S/N ratio can always be secured, thereby making it possible to secure the response and stability of calculation of a correction amount for the timing signal.

BRIEF DESCRIPTION OF THE DRAWINGS

FIG. 3 is a diagram showing the change in engine speed at the time of a misfire of the engine.

FIGS. 10A and 10B show characteristics of a misfire S/N ratio with respect to the engine speed and the engine load, in which FIG. 10A is a state diagram after the pitch error correction according to the invention and FIG. 10B is a conventional state diagram before the pitch error correction.

DESCRIPTION OF THE PREFERRED EMBODIMENTS

An engine control system according to an embodiment of the present invention will be described below with reference to the accompanying drawings.

Figure 1:
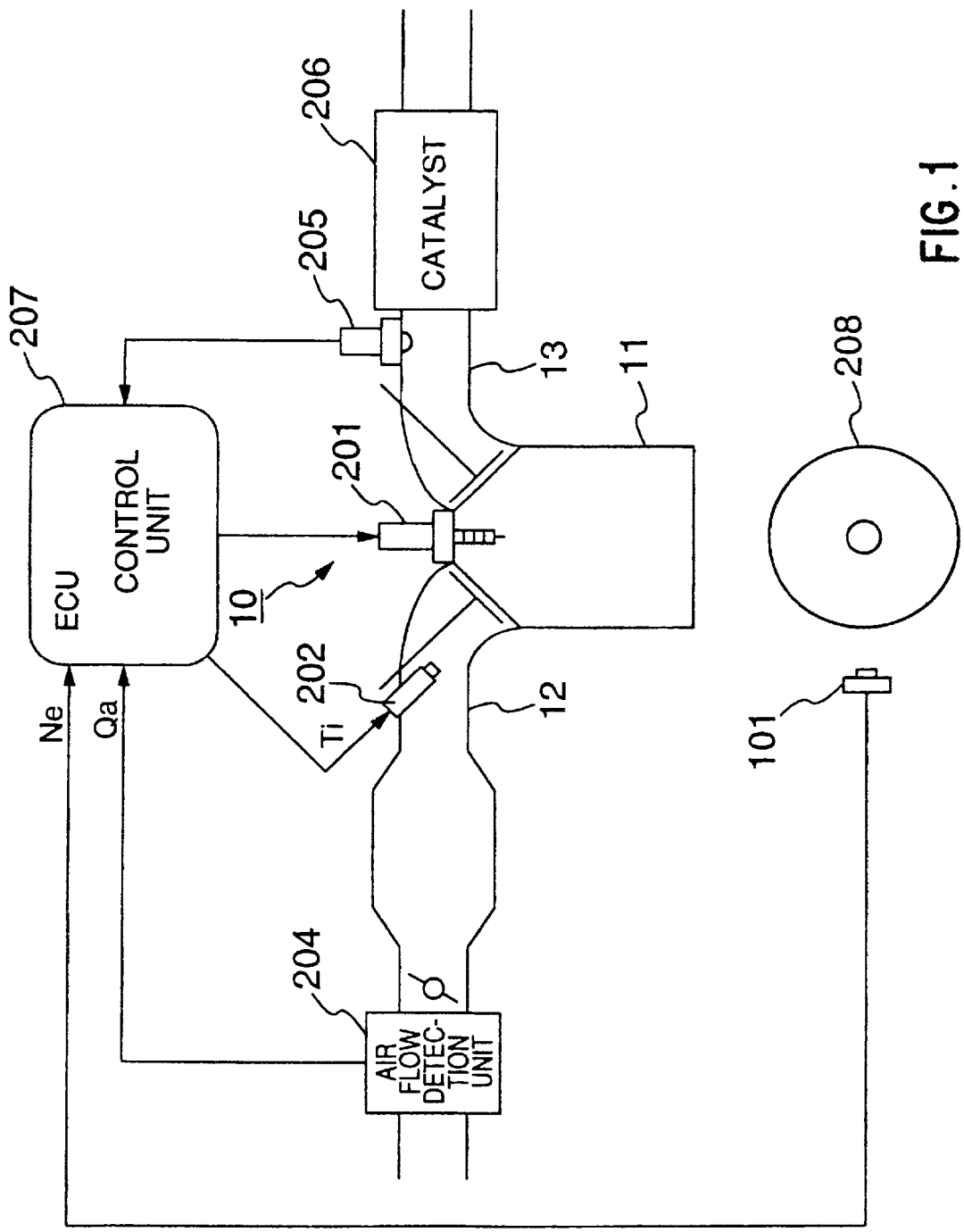
FIG. 1 is a diagram showing a general configuration of a combustion state detection system for an internal combustion engine according to an embodiment of the invention.

FIG. 1 shows a general configuration of a control system for an internal combustion engine 10.

The internal combustion engine 10 includes four cylinders. Each cylinder 11 is connected to an intake pipe 12 and an exhaust pipe 13. An ignition unit 201 is mounted on each cylinder 11. A fuel injection unit 202 is arranged in the intake pipe 12. An air cleaner (not shown) and an air flow rate detection unit 204 are mounted upstream of the fuel injection unit 202. An air-fuel ratio sensor 205 and a three-way catalyst 206 are mounted on the exhaust pipe 13.

The control unit 207 for the internal combustion engine 10 fetches an output signal Qa of the flow rate detection unit 204 and the engine speed Ne of the ring gear or the plate 208 (engine) detected by an engine speed detection unit 101. The control unit 207 thus calculates a fuel injection amount Ti based on the detection value and controls the injection amount of the fuel injection unit 202.

The engine control unit 207 also carries out what is called the air-fuel ratio feedback control of the engine 10 in which the air-fuel ratio in the engine is controlled by correcting the fuel injection amount Ti to achieve a stoichiometric air-fuel ratio based on the air-fuel ratio in the engine 10 detected by the air-fuel ratio sensor.

Figure 2:
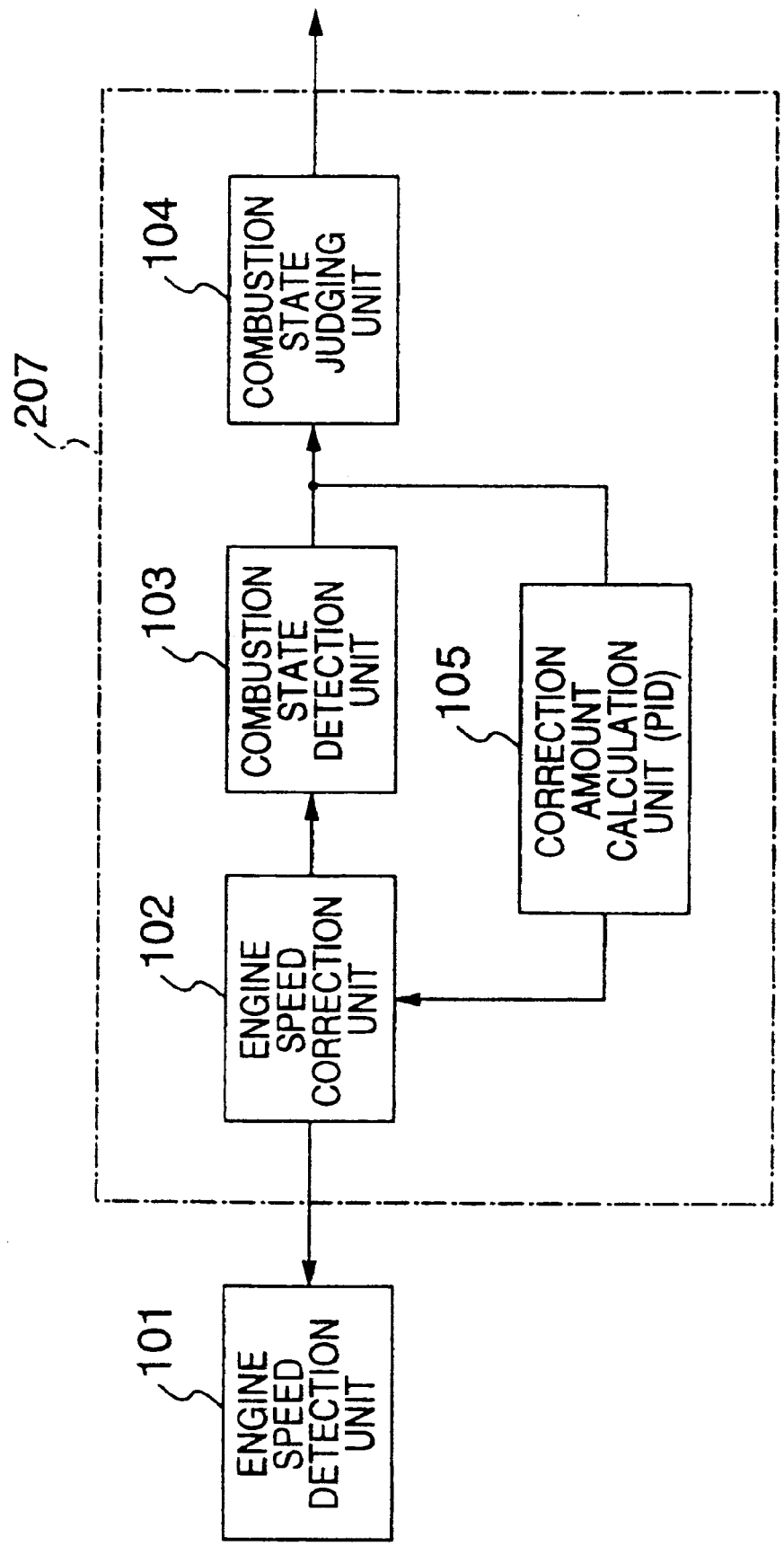
FIG. 2 is a block diagram for the basic control operation of the combustion state detection system shown in FIG. 1.

FIG. 2 is a block diagram for basic control of the detection of the combustion state of the control system 207 of the internal combustion engine 10 according to this embodiment. In this control block diagram, the engine speed is detected by an engine speed detection unit 101 and corrected by an engine speed correction unit 102. The engine speed thus corrected is applied to a combustion state detection unit 103 to calculate the detection value of the combustion state. A combustion state judging unit 104 judges a combustion state (occurrence or no-occurrence of a misfire according to this embodiment).

In the process, a correction amount calculation unit 105 determines a correction amount for correcting the detected engine speed based on the combustion state detection value, and the engine speed correction unit 102 corrects the detected engine speed. The correction amount calculation unit 105 performs the PID action in such a manner that the deviation between the combustion state detection value of a group of cylinders including a reference cylinder and an opposed cylinder having the same crank phase as the reference cylinder and the combustion state detection value of the remaining cylinders of the engine 10 is corrected not to assume an excessively large value but to decrease to zero as a target in the high engine speed area.

FIG. 3 shows the engine speed with respect to the crank angle of the engine. The solid line represents a waveform associated with a misfire of the fourth cylinder, and the dashed line represents a waveform associated with a normal combustion state.

Each engine speed measurement section (hereinafter called the window) for each cylinder in FIG. 3 will be explained below.

The top dead center (TDC) of each cylinder is detected by a reference signal REF. A first crank angle is determined as a window start point Ws using an angular signal POS from TDC. From the window start point Ws, a second crank angle is determined similarly using the angular signal POS. The length from the first crank angle to the second crank angle is defined as a window width W.

Now, the time when a cylinder in ignition cycle passes a window is defined as $TDATA_{(n)}$, and a combustion state parameter D1A is determined from equation (1).

$$D1A = (TDATA_{(n)} - TDATA_{(n-1)})/(TDATA_{(n-1)})^3 \quad (1)$$

where $TDATA_{(n)}$ is the time when a cylinder in the current ignition cycle passes the window W, $TDATA_{(n-1)}$ is the time when a cylinder in the previous ignition cycle passes the window W, and D1A is a combustion state parameter.

Figures 4A, 4B:
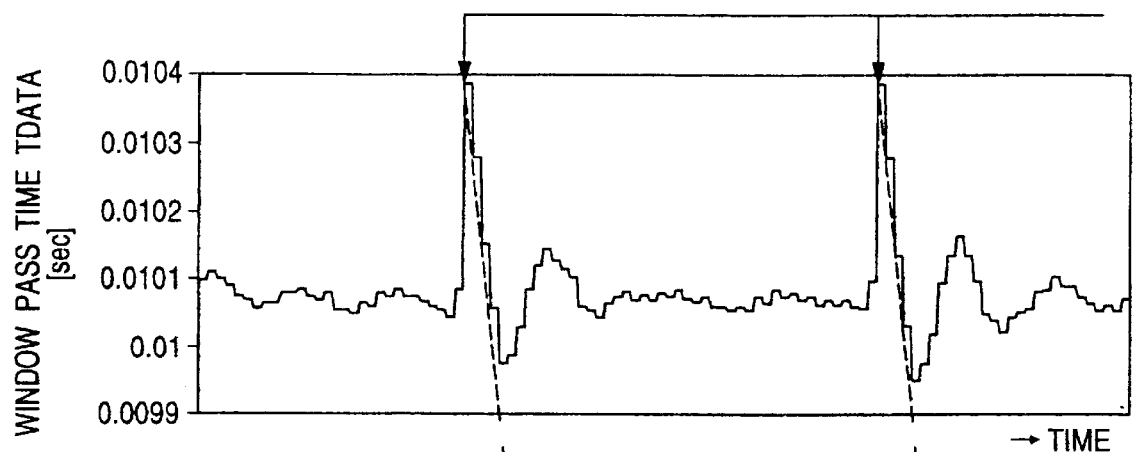
FIG. 4 is a diagram showing a combustion parameter D1A and a window pass time TDATA at the time of a misfire of the engine.

In the normal combustion state of the engine 10, the time when each cylinder 11 passes the window is equal and therefore the combustion state parameter D1A assumes zero in equation (1). When the engine 10 suffers a misfire, in contrast, the misfired cylinder ceases to generate the torque and the engine speed decreases. Therefore, the value of TDATA increases and the combustion state parameter D1A assumes a certain positive value. The combustion state parameter D1A is compared with a preset value and thus it is possible to detect the presence or absence of a misfired cylinder (FIG. 4).

Although the description is made about the case of a four-cylinder engine in this embodiment, the invention is not limited to the four-cylinder engine.

Figure 5A:
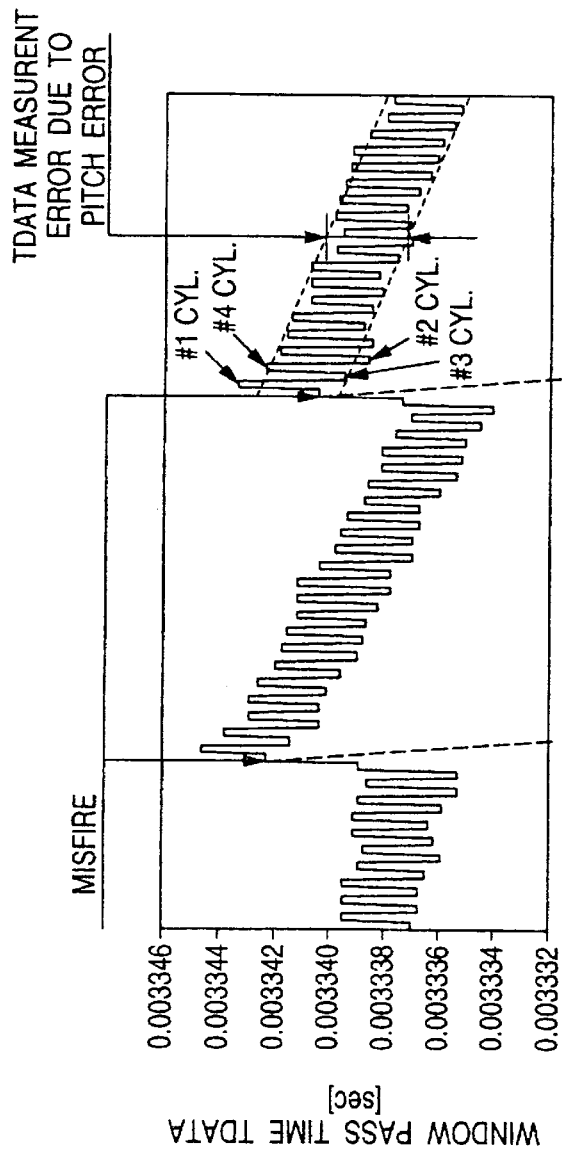
FIG. 5 is a diagram showing a combustion parameter D1A and a window pass time TDATA in the presence of a pitch error.
Figure 5B:
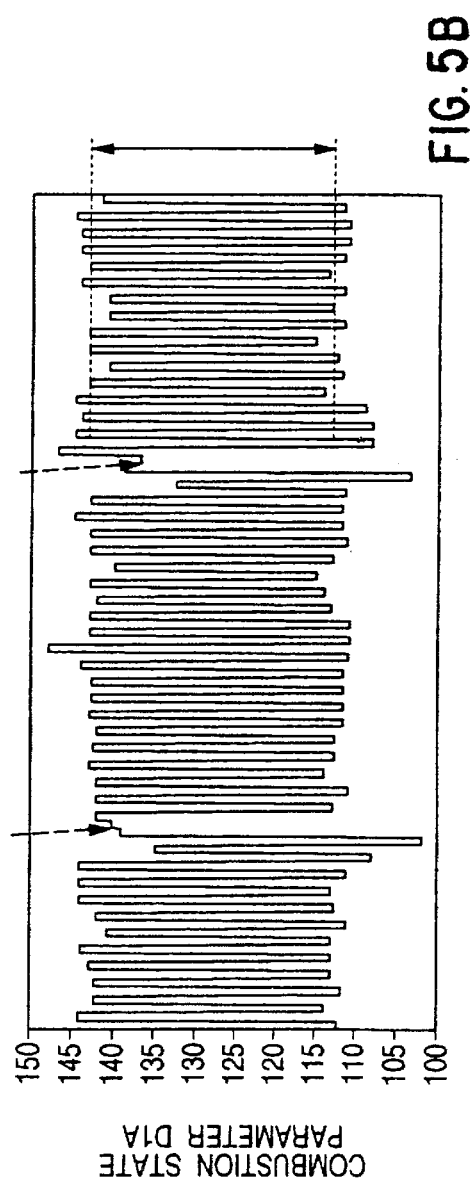

The above-mentioned method is effective for a comparatively low engine speed area. In a high engine speed area, however, variations between the non-opposed cylinders become excessive due to pitch fabrication error of the plate or the ring gear are so great that a misfired cylinder cannot be detected. This fact is shown in FIG. 5. In high engine speed area, TDATA contains the measurement angle error due to the fabrication error of the plate or the ring gear, and therefore a vibration occurs. This also causes a vibration of the combustion state parameter D1A calculated by equation (1) which is a differential equation. The combustion state parameter D1A for a misfire comes to be hidden behind this vibration width, thus making it impossible to detect a misfire. According to this embodiment, there is provided a means for improving the detection accuracy in high engine speed area.

A careful observation of TDATA in FIG. 5 reveals that there is no substantial difference in TDATA due to errors from fabrication processes, though steadily decreasing due to the inertia of the crankshaft, between the first and fourth cylinders (between the opposed cylinders having the same crank phase). This is also the case with TDATA for the second and third cylinders (the opposed cylinders). A deviation in TDATA occurs obviously, however, between the non-opposed cylinders, i.e., between the first and third cylinders and between the first and second cylinders (between the fourth and second cylinders, and between the fourth and third cylinders). This deviation constitutes a measurement error caused by the fabrication error of the plate or the ring gear.

Figure 6A:
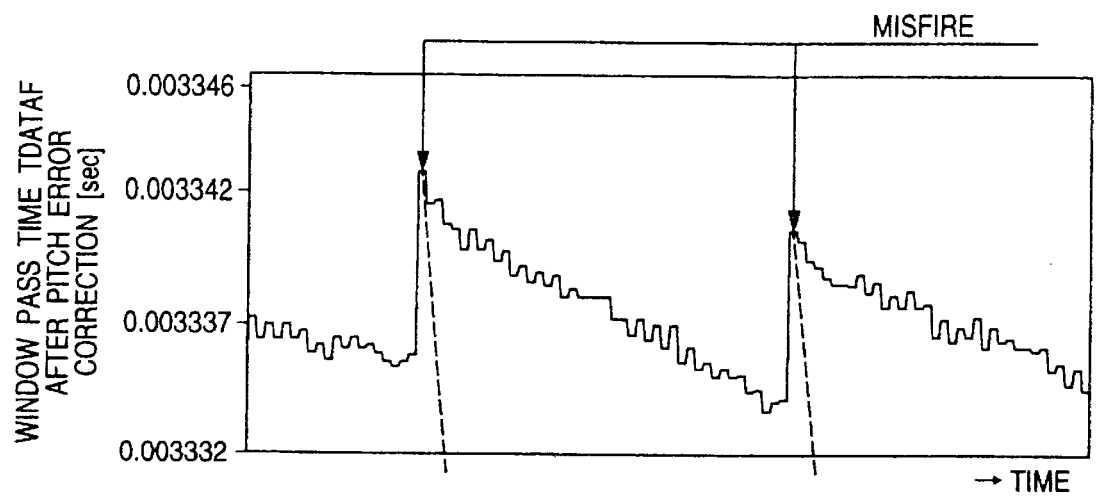
FIG. 6 is a diagram showing a combustion parameter D1A and a window pass time TDATA after correction of a pitch error.
Figure 6B:
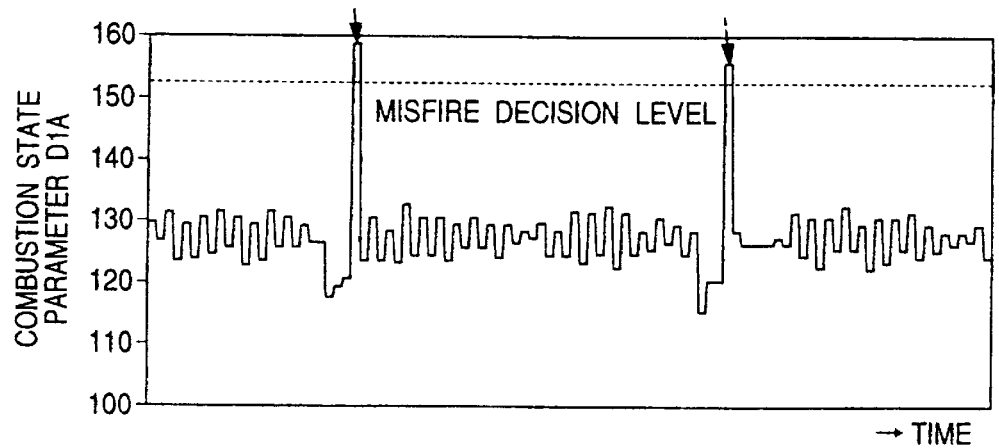

In order to obviate this error, a reference cylinder is set, and a correction coefficient for multiplication is introduced so that the TDATA of the remaining cylinders conforms with the TDATA level of a group of cylinders including the reference cylinder and the opposed cylinder. According to this embodiment, the reference cylinder is defined as #2 cylinder, the opposed cylinder as #3 cylinder, and the remaining cylinders as #1 and #4 cylinders. This correction coefficient is called the pitch error correction coefficient PEC hereinafter, and the multiplication of the pitch error correction coefficient PEC by TDATA is called the pitch error correction. FIG. 6 shows the combustion state parameter D1A with the pitch error correction coefficient PEC set to 0.999. As shown in FIG. 6, the pitch error correction can set a proper decision level and detect a misfire even in high engine speed area.

In order to check the misfire detection rate quantitatively, a misfire S/N ratio is defined by equation (2). The S/N ratio provides a measure for checking the degree to which the combustion state parameter at the time of a misfire is higher than the corresponding parameter at the time of no-misfire.

S/N ratio=(average combustion state parameter with misfire−average combustion state parameter without misfire)/(standard deviation of combustion state parameter with misfire+standard deviation of combustion state parameter without misfire) (2)

The S/N ratio for the case where the pitch error is corrected and the S/N ratio for the case where the pitch error is not corrected are calculated from equation (1). Then, the FIG. 0.63 is obtained for the case where the pitch error is not corrected, and 4.78 for the case where the pitch error is corrected.

The S/N ratio of 1 is considered to represent a detection accuracy of 70%, the S/N ratio of 2 to represent a detection accuracy of 95%, and the S/N ratio of 3 to give a detection accuracy of 100%. The pitch error correction, therefore, can produce the detection accuracy of 100%.

Now the calculation of the pitch error correction coefficient PEC will be explained. In the foregoing description, the pitch error correction coefficient PEC was set to 0.999. Unless this value is proper, however, the misfire S/N ratio may not be improved but often deteriorated.

The main feature of the present embodiment is provision of a means for calculating the pitch error correction coefficient PEC within the engine control system. If possible, the pitch error correction coefficient PEC should be properly changed while calculating the misfire S/N ratio so that the misfire S/N ratio assumes a maximum value. It is, however, impossible to cause a misfire forcibly to determine a S/N ratio. In view of this, a parameter proportional (or inversely proportional) to the S/N ratio is introduced. A candidate of this parameter is the deviation (inversely proportional to the S/N ratio) of the combustion state parameter D1A between non-opposed cylinders. This deviation is the difference between level 1 and level 2 of the combustion state parameter shown in FIG. 5. The S/N ratio can be maximized by regulating this deviation to a value not more than a predetermined value or referably to zero.

The PID (Proportional, Integral and differential) action used widely for the control engineering is employed as a means for reducing the deviation to zero. The PID action is a control method in which the operation amount is calculated and the control amount of a specific plant is controlled to a target value generally by adding all of the proportional portion of the deviation between the control amount and the target value, the derivative portion of the deviation and the integral portion of the deviation. The use of the PID action for calculating the pitch error correction coefficient PEC is one of the features of the invention.

Figure 7:
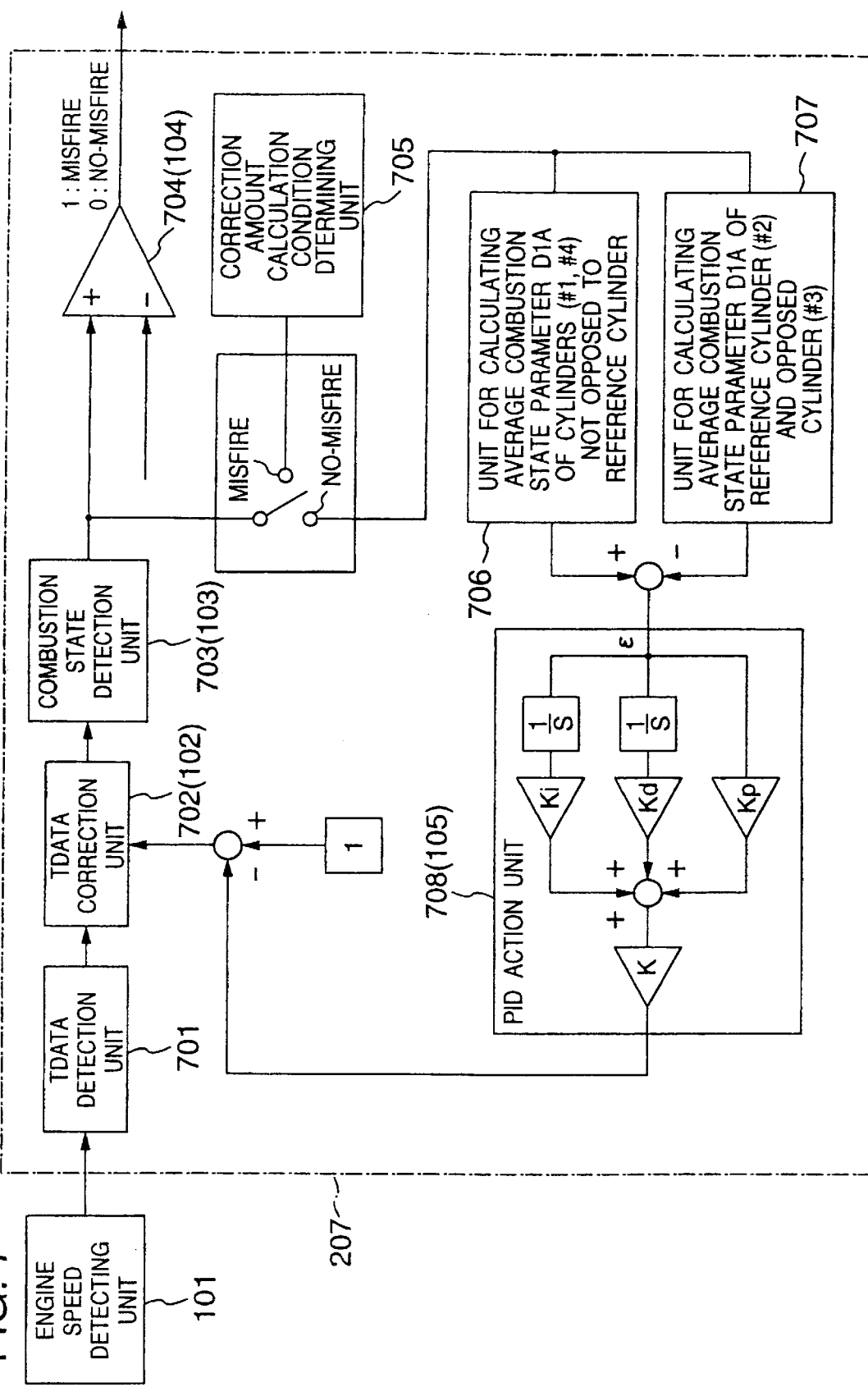
FIG. 7 is a detailed control block diagram for a misfire diagnosis for the combustion state detection system shown in FIG. 1.

FIG. 7 is a detailed control block diagram for misfire diagnosis in a control system according to the present embodiment.

In this detailed control block diagram, the rotational speed of the internal combustion engine 10 is detected by an engine speed detection unit 101, and the time required for rotating the crankshaft by a predetermined angle (the window pass time TDATA) is detected by a TDATA detection unit 701 based on the detection value of the engine speed. The TDATA correction unit 702 applies the pitch error correction coefficient PEC only to the first and fourth cylinders by multiplication, for example, for the purpose of correcting the TDATA.

After that, the combustion state parameter D1A is calculated by equation (1) from the TDATA corrected by the combustion state detection unit 703. A combustion state judging unit 704, which is for judging a misfire, counts a misfire in the case where the combustion state parameter D1A is larger than a specific decision level determined from the engine speed and the load.

A correction amount calculation condition determining unit 705 is a control means which is turned on for performing the PID action only in case of a no-misfire. In the case where a misfire is not judged by the combustion state judging unit 704, an average combustion state parameter calculation unit 706 calculates the average value of the combustion state parameter D1A of the reference cylinder and the cylinder (second and third cylinders) opposed thereto, while another average combustion state parameter calculation unit 707 calculates the average value of the combustion state parameter D1A of the remaining cylinders (first and fourth cylinders). The deviation E between the two average values is determined by the PID control unit 708 and the PID action is performed. The control operation in the PID control unit 708 is performed in such a manner that a predetermined multiple of the deviation E between the two average values, a predetermined multiple of the derivative portion of the deviation $\epsilon$ and a predetermined multiple of the integral portion of the deviation $\epsilon$ are added to each other, and the resulting sum is multiplied by a predetermined number. The product thus obtained is subtracted from unity, and the difference is used as the pitch error correction coefficient PEC.

Then, the window pass time TDATA for only the first and fourth cylinders to be detected next is multiplied by the pitch error correction coefficient PEC calculated by the PID control unit 708. The pitch error correction coefficient PEC calculated in this way has a superior response, a superior stability and a superior robustness and provides a value useful for detecting and correcting the fabrication error of the plate or the ring gear accurately.

Figure 8:
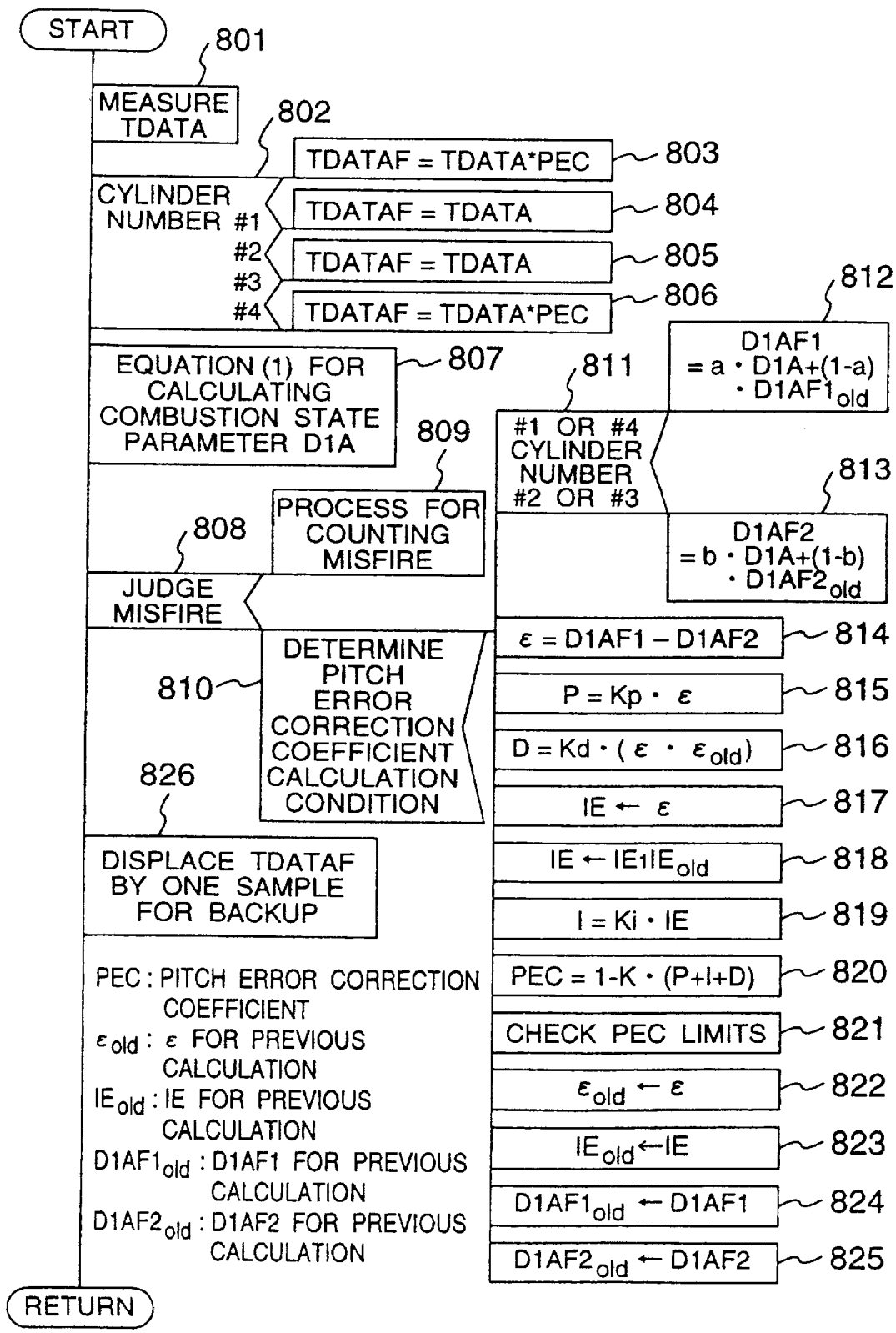
FIG. 8 is a control flowchart of a misfire diagnosis PAD using the pitch error correction control based on the combustion state detection system shown in FIG. 1.

FIG. 8 is a PAD diagram in the form of control flowchart for misfire diagnosis according to this embodiment processed as described above.

This control flow is executed when a misfire diagnosis is established. The diagnosis may not present an accurate misfire count in the transient areas of acceleration, deceleration or load variations. In such a case, the diagnosis is inhibited.

This process is executed for each ignition. Step 801 measures the window pass time TDATA, and step 802 executes includes steps 803 to 806 executed for each ignition cylinder. Specifically, the TDATA of only the first and fourth cylinders is multiplied by the pitch error correction coefficient PEC, while the TDATA of the second and third cylinders is not multiplied by the pitch error correction coefficient PEC.

In step 807, the combustion state parameter D1A is determined from equation (1). In the case where the combustion state parameter D1A is larger than the decision level (as determined from the engine speed and the load) in step 808, a misfire is judged, and a misfire is counted in step 809. In the case where the combustion state parameter D1A is smaller than the decision level, on the other hand, step 810 checks whether a pitch error correction area is involved or not. If the pitch error correction area is involved, steps 811 to 825 are executed.

Whether the pitch error correction area is involved or not is determined based on the conditions of engine speed and load. In the case where the first or fourth cylinder is in ignition cycle in step 811, step 812 determines the average value D1AF1 of the combustion state parameters D1A of the first and fourth cylinders. In the case where the second and third cylinders are in ignition cycle, on the other hand, step 813 determines the average value D1AF2 of the combustion state parameters D1A of the second and third cylinders. Then step 814 determines the deviation $\epsilon$ between the average D1AF1 and D1AF2. Step 815 multiplies the deviation $\epsilon$ by Kp and thus determines the proportional portion P. Also, step 816 multiplies the difference between the deviation $\epsilon$ and the deviation $\epsilon$ old for the previous calculation by Kd and thus determines the derivative portion D.

In step 817, a dummy deviation IE is substituted into the deviation $\epsilon$ as a preprocess for determining the integral portion of the deviation $\epsilon$. Step 818 alters the sum of this dummy deviation IE and the dummy deviation IE for the previous calculation thereby to determine a new dummy deviation IE. Step 819 multiples the determined dummy IE by Ki and thus determines the integral portion I. In step 820, P, D and I are added to each other, the sum is multiplied by K, and the resulting product is subtracted from unity thereby to determine a pitch error correction coefficient PEC.

According to the present embodiment, it is assumed that Kp=Kd=Ki=1 and K=10e−6. Step 821 checks the upper and lower limits of the pitch error correction coefficient PEC thus determined, followed by steps 822 to 825 for executing the process for the next calculation. Step 822 sets the deviation $\epsilon$ to $\epsilon_{old}$, and the dummy deviation IE to $IE_{old}$. Step 824 sets D1AF to $D1AF_{old}$, and steps 825 sets D1AF2 to $D1AF2_{old}$. Finally, in step 826, the window pass time TDATA after correction is displaced by one sampling period as a backup process.

Figure 9A:
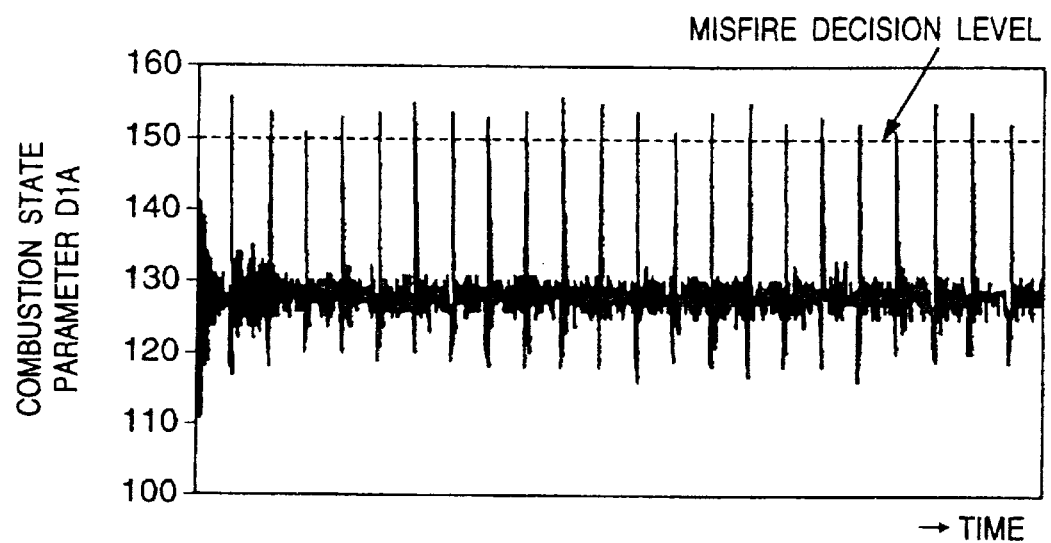
FIGS. 9A and 9B are diagrams showing a pitch error correction coefficient PEC and a combustion state parameter D1A after the pitch error correction based on the combustion state detection system of FIG. 1.
Figure 9B:
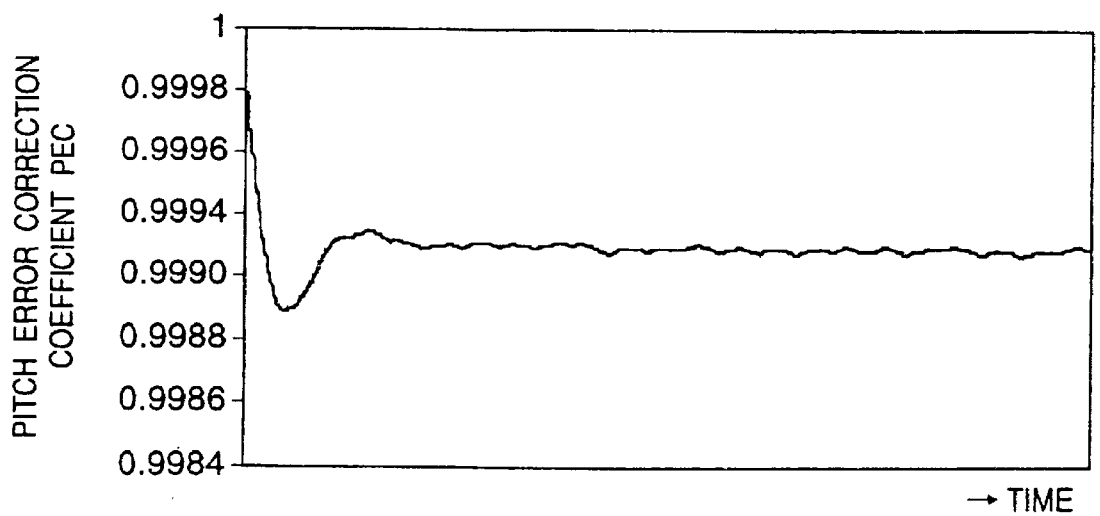

FIG. 9A shows an example of the combustion state parameter D1A. FIG. 9B shows the pitch error correction coefficient PEC obtained by using the misfire diagnosis means according to this embodiment. The same conditions (6000 rpm, no load) are employed in FIG. 9B as in FIG. 5. Although the pitch error correction coefficient PEC decreases and an undershoot occurs with the lapse of time, a predetermined value is quickly reached. Thus the detection accuracy of the combustion state parameter D1A is improved up to an extent where a misfire can be detected by setting an appropriate decision level.

Figure 10A:
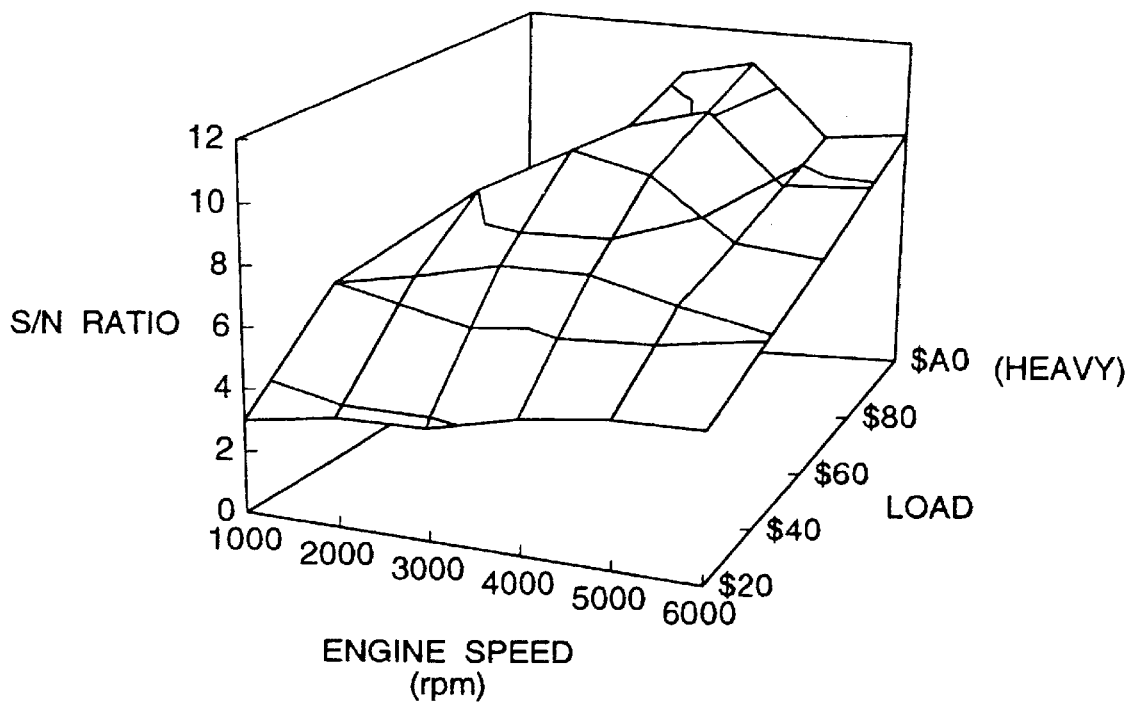
Figure 10B:
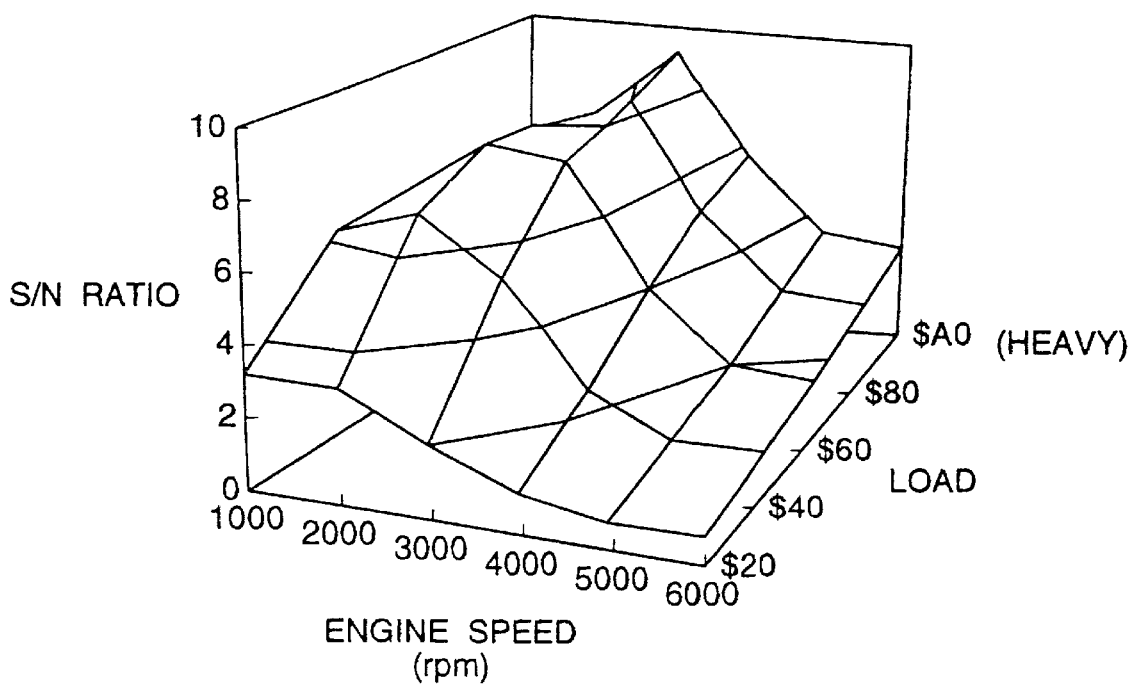

FIG. 10A and 10B show the S/N ratios determined by the conventional control means and the control means of the present embodiment based on the TDATA measured in an operable area (entire area). FIG. 10A shows the S/N ratio determined according to the present embodiment, and FIG. 10B shows the SIN ratio determined by the conventional control means. As seen from FIG. 10B, the S/N ratio decreases in a low-load, high engine-speed area for the conventional control means, while the S/N ratio of at least 3 is secured in every area for the control means according to the present embodiment. A misfire can be detected over the entire areas, therefore, by setting a proper decision level. Also, the pitch error correction coefficient PEC can be calculated with few variations, based on the accurate detection of a fabrication error of the plate or the ring gear mounted on the crank shaft of the internal combustion engine.

An embodiment of the present invention was described in detail above. The present invention, however, is not limited to this embodiment, but can be variously modified in design without departing from the scope and spirit of the invention described in the claims attached hereto.

The combustion state detection system for an internal combustion engine according to this embodiment comprises a pitch error correction means for setting the TDATA of the cylinders (#1 and #4 cylinders) other than the reference cylinder (#2 cylinder) and the opposed cylinder (#3 cylinder) to that of the reference cylinder (#2 cylinder) and the opposed cylinder (#3 cylinder). Alternatively, the reference cylinder can be defined as #1 cylinder, the cylinder opposed to the reference cylinder as #4 cylinder, and the remaining cylinders as #2 and #3 cylinders. In such a case, in the misfire diagnosis PAD diagram of FIG. 8 using the pitch error correction, steps 803 and 804 are replaced by each other, and steps 805 and 806 are replaced by each other. In addition, step 814 is altered as described below.

Deviation ε=D1AF2−D1AF1

This alteration can of course produce a similar function and effect to the above-mentioned case.

It will thus be understood from the foregoing description that according to the combustion state detection system for an internal combustion engine according to the present invention comprises means for calculating the average value of the combustion state parameters D1A of a reference cylinder and the cylinder opposed thereto, means for calculating the average value of the combustion state parameters of the remaining cylinders, means for determining the deviation between the two average values, and means for correcting the TDATA by calculating the pitch error correction coefficient by PID action, wherein the combustion state of an internal combustion engine can be diagnosed in all the areas including the high engine speed area where a positive torque is generated.

Also, the deviation of the average value is processed by PID action, so that the deviation can always be controlled to not more than a predetermined value or to zero. It is thus always possible to secure a maximum S/N ratio, while at the same time securing the response and stability in calculating the correction amount of the timing signal.

What is claimed is:

1. A combustion state detection system for an internal combustion engine comprising:

means for detecting a timing signal associated with the rotation of the crankshaft by a predetermined angle;

means for correcting said timing signal;

means for calculating a combustion state parameter from said timing signal;

means for detecting the deviation of the value of the calculated combustion state parameter for combustion between the cylinders;

means for calculating a correction amount of said timing signal; and wherein said deviation detection means determines a reference cylinder and detects the deviation between the value of the combustion state parameter for normal combustion of a cylinder group including said reference cylinder and an opposed cylinder having the same crank phase as said reference cylinder and the value of the combustion state parameter for normal combustion of the remaining cylinders;

said correction amount calculation means calculates the amount of correcting said timing signal from said detected deviation; and said timing signal correction means corrects said timing signal based on said correction amount.

2. A combustion state detection system for an internal combustion engine according to claim 1, wherein said correction amount calculation means performs a PID action for determining the correction amount in such a manner that said deviation does not exceeds a predetermined value or reaches to zero.

3. A combustion state detection system for an internal combustion engine according to claim 1, wherein said timing signal correction means uses said correction amount as a timing signal for the cylinders not opposed to said reference cylinder.

4. A combustion state detection system for an internal combustion engine according to claim 1, wherein said deviation detection means detects the deviation between the average value of the combustion state parameters for normal combustion of the cylinder group including said reference cylinder and said opposed cylinder on the one hand and the average value of the combustion state parameters for normal combustion of the remaining cylinders on the other.

5. A combustion state detection system for an internal combustion engine according to claim 1:

wherein an upper limit and/or a lower limit is set on said correction amount calculated by said correction amount calculation means.

6. A combustion state detection system for an internal combustion engine according to claim 1, further comprising:

combustion state judging means for comparing said combustion state parameter with a decision level and thus judging whether a misfire has occurred or not.

7. A combustion state detection system for an internal combustion engine according to claim 6:

wherein the decision level used for judging whether a misfire has occurred or not is provided by a map of engine speed and engine load.

8. A combustion state detection system for an internal combustion engine comprising:

means for detecting a timing signal associated with the rotation of the crankshaft by a predetermined angle;

means for correcting said timing signal;

means for calculating a combustion state parameter from said timing signal;

means for detecting the deviation of the value of the calculated combustion state parameter for combustion between the cylinders;

means for calculating a correction amount of said timing signal; and a correction amount calculation condition determining means for determining the conditions for calculating said correction amount in accordance with the engine speed, the engine load, the timing of a misfire, the ruggedness of the road on which the vehicle is running, and the timing when a misfire diagnosis is established.

* * * * *